United States Patent [19]

Johnson et al.

[11] Patent Number: 4,562,033
[45] Date of Patent: Dec. 31, 1985

[54] METHOD OF MANUFACTURING ARTICLES FROM A COMPOSITE MATERIAL

[75] Inventors: Frank C. Johnson, Nottingham; Susan M. Newsam, Derby, both of England

[73] Assignee: Rolls-Royce Limited, London, England

[21] Appl. No.: 506,422

[22] Filed: Jun. 21, 1983

[30] Foreign Application Priority Data

Jul. 24, 1982 [GB] United Kingdom ............... 8221467

[51] Int. Cl.$^4$ ............................................. B29B 9/04
[52] U.S. Cl. .................................... 264/510; 264/102
[58] Field of Search ................ 264/510, 512, 102; 156/87, 286

[56] References Cited

U.S. PATENT DOCUMENTS

| | | | |
|---|---|---|---|
| 3,575,756 | 4/1971 | Maus | 156/286 X |
| 3,666,600 | 5/1972 | Yoshino | 264/510 X |
| 4,065,340 | 12/1977 | Dickerson | 156/286 X |
| 4,311,661 | 1/1982 | Palmer | 264/102 X |
| 4,350,545 | 9/1982 | Garabedian | 264/102 X |

*Primary Examiner*—Jan Silbaugh
*Attorney, Agent, or Firm*—Cushman, Darby & Cushman

[57] ABSTRACT

A method of vacuum moulding a composite material in which laid-up prepregs uncured resin and reinforcing filaments are placed on a heated former and covered with a sheet of a microporous film material a breather material and an impermeable membrane. The volume enclosed by the membrane is evacuated and the temperature of the mould increased to firstly outgas the resin and mould the prepregs to the shape of the former and finally cure the resin. The arrangement ensures excellent access of the prepregs to the vacuum during the moulding operation, thereby in turn ensuring that the resultant moulded article has very low porosity as a result of gas or vapor inclusions or is porosity-free.

6 Claims, 1 Drawing Figure

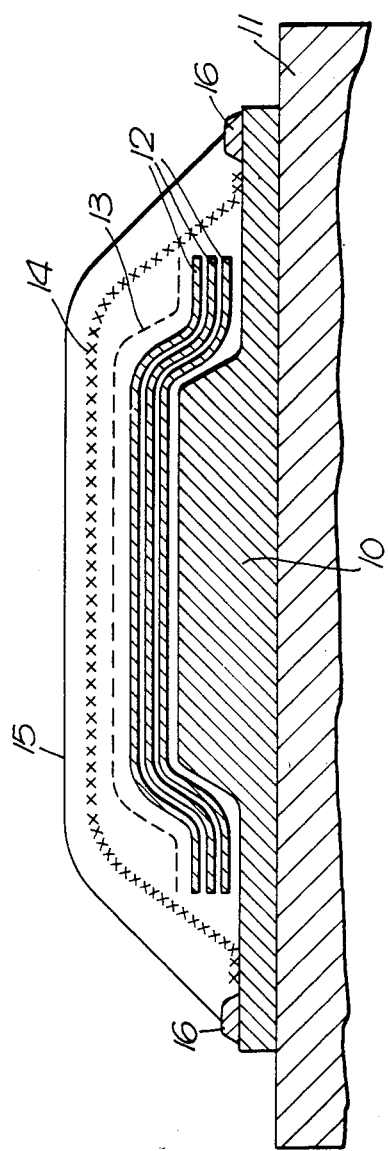

METHOD OF MANUFACTURING ARTICLES FROM A COMPOSITE MATERIAL

This invention relates to a method of manufacturing articles from composite materials and in particular composite materials which comprise reinforcing filaments enclosed in a resin matrix.

A common method of manufacturing articles from composite materials is to lay up a number of sheets of uncured resin impregnated filaments called prepregs on a suitable former and then subject them to heat and pressure in order to coalesce the sheets, mould them to the configuration of the mould and subsequently gel the resin. The resin is then finally cured by further heat treatment in order to fix the resultant configuration of the moulded article.

One way in which this method can be carried out is to utilise an autoclave. An autoclave is capable of subjecting the laid up prepregs to elevated temperatures and pressures so that they readily coalesce to form the moulded article. It has the attraction of being capable of supplying sufficient pressure to the resin mass that hydraulic pressure within the mass causes a significant reduction in the size of enclosed gas or vapour bubbles or completely force them into solution depending upon the level of pressure applied (in accordance with Henry's Law). If the pressure is maintained during the gellation of the resin and its subsequent cure, a void-free resin matrix is achieved.

Whilst autoclave moulding is attractive in view of its potential for providing a void-free composite material article, it is nevertheless expensive to carry out in view of the high capital cost of the equipment involved.

A cheaper alternative to autoclave moulding is vacuum bag moulding in which the laid-up prepregs are placed on a former and then enclosed by an impervius membrane. The volume enclosed by the membrane is evacuated and the assembly heated up on a rising temperature schedule. Atmospheric pressure provides the necessary force to coalesce the prepregs to form the moulded article and the rising temperature schedule ensures initially that the uncured resin is sufficiently mobile to permit maximum consolidation to take place and subsequently results in the gelling and curing of the resin.

Whilst vacuum moulding is a lot cheaper to carry out than is autoclave moulding, the resultant moulded article is usually of inferior quality because of the occurance of voids in the resin matrix. Typically the minimum voidage level of a vacuum moulded fibre reinforced composite material is in the order of from 4 to 6% by volume.

It is an object of the present invention to provide a method of manufacturing articles from fibre reinforced composite materials in which the level of voidage in the result articles is lower than is achieved by conventional vacuum moulding techniques or is completely eliminated.

According to the present invention, a method of vacuum moulding an article from a filament reinforced composite material comprises the step of laying up, on a suitable former, a plurality of prepregs each comprising reinforcing filaments and an uncured resin, overlaying at least a major portion of the exposed surface of said laid-up prepregs with at least one sheet of a microporous film material which is permeable to gases and vapours but impermeable to liquid resin, overlaying at least a major portion of said sheet of microporous film material with a breather material, enclosing said laid-up prepregs, said at least one sheet of microporous film material and said breather material with a gas impermeable membrane, evacuating the volume enclosed by said membrane, heating said prepregs at a temperature which is high enough to cause the resin in said prepregs to outgas and become sufficiently mobile to permit the coalescing and moulding of said prepregs to take place and forsaid resin to subsequently gel but low enough for outgassing to be substantially completed before said gelling commences, for sufficient time for said outgassing, moulding and gelling to occur, and subsequently curing said resin.

The invention will now be described, by way of example, with reference to the accompanying drawing which is a diagrammatic sectioned side view, in partially exploded form, of apparatus for carrying out the method of the present invention.

With reference to the drawing, a low expansion former 10 is located in the surface of a hot plate 11. Three prepregs 12 are then laid up on the former 10 although it will be appreciated that more or less prepregs could be used depending upon the desired characteristics of the resultant moulded article. Each prepreg 12 consists of a five end satin weave carbon fibre fabric which is impregnated with an uncured epoxy resin. It will be appreciated, however, that the prevent invention is not specifically restricted to the use of such prepregs and that for instance prepregs consisting of filaments other than carbon fibre, such as glass or Kevlar, and uncured resins other than epoxy resins may be utilised. Moreover the filaments need not be woven but could be unidirectional.

The laid-up prepregs are then covered with a sheet 13 of a microporous film material which is permeable to gases and vapours but impermeable to liquid resin. The preferred microporous film material is a material known as Celgard Microporous film 4510 manufactured by Celanese Plastics Company U.S.A.) which is a thin lightweight polypropylene film containing uniform submicron pores. The pores can be considered as discrete, sightly tortuous channels which extend from one surface of the film to the other. The film is highly permeable to gases and vapours but acts as an effective barrier to particles which are greater than 0.04 microns. The particular sheet 13 of microporous film material for use in the method of the present invention is 0.005" (0.125 mm) thick.

The sheet 13 of microporous film material is then overlaid with a sheet of breather material 14. The particulr breather material 14 used is a polyester breather felt material known as Airweave N10 (obtainable from Aero Consultants Limited). However other suitable breather materials may be used, for instance woven glass cloth or glass scrim.

The assembly of laid-up prepregs 12, the sheet 13 of microporous film material and the sheet of breather material 14 are then enclosed by a gas impremeable membrane 15 which is sealed to the outer edges of the former 10 by means of a suitable sealant material 16. The membrane 15 is a conventional nylon vacuum bagging film 0.003" (0.076 mm) thick known as Capran 512 H and obtainable from Allied Chemicals Interntional.

When the membrane 15 has been sealed to the mould 10, the volume which it encloses is evacuated by a vacuum pump (not shown). A short time may be allowed to elapse in order to ensure consolidation of the prepregs 12. The temperature of the hot plate 11 is then increased from room temperature up to and then maintained at a temperature at which the resin in the prepreg outgases and becomes sufficiently mobile for the prepregs to coalesce and conform to the shape of the former 10 before gelling of the resin. The actual temperature and the time for which that temperature is maintained are chosen so that the outgasing of the resin and the moulding of the prepregs are substantially completed before the resin begins to gel. This ensures that porosity in the gelled, coalesced prepreg resulting from entrained gases and vapor is at a very low level or is completely eliminated. The temperature of the hot plate is then increased to a temperature at which complete curing of the resin takes place. When the temperature has been maintained for sufficient time for substantially complete curing of the resin to take place, the temperature of the hot plate is reduced, the vacuum removed and the assembly dismantled to facilitate the removal of the resultant moulded article.

Although a hot plate and separate former assembly have been described above, other methods of heating the laid-up prepregs 12 could be employed. For instance the former 10 could incorporate its own heating elements. Alternatively the whole assembly of former 10, the prepregs 12, the sheet 13 of microporous film material, the breather material 14 and the membrane 15 could be placed in a suitable oven.

The sheet 13 of microporous film material and the breather material 14 ensure that the whole of the exposed surface of the prepregs 12 is exposed to the vacuum. The breather material 14 provides access to the vacuum but the sheet 13 of microporous film material, in addition to providing access to the vacuum, ensures that none of the liquid resin from the prepregs passes through it.

Thus the method of the present invention ensures that no liquid resin is drawn into the breather material prior to gelling taking place. This being so, the prepregs have access to the vacuum throughout the moulding operation. Consequently the outgassing of the resin in the prepregs 12 is extremely effective, thereby ensuring that the levels of porosity in the final moulded article are very low or eliminated altogether.

It may be desirable in certain eases to provide a release material on either or both of the surfaces of the laid-up prepregs. Such material may be necessary if, for instance, a particular surface finish is required on the moulded article.

The method of the present invention is illustrated by following examples:

EXAMPLE 1

Three prepreg layers each measuring 13 inches by 11 inches and comprising 5 end satin weave carbon fibre fabric (T3003K obtainable from Toray Industries) impregnated with BSL914 epoxy resin (43±2.5% w/w resin) were laid-up on the former 10 (BSL914 epoxy resin is obtainable from CIBA-Geigy Plastics and Additive Co. B.S.D. Cambridge). The exposed surface of the laid-up prepregs was then covered with a release fabric called Bleeder lease B which is a nylon peel ply coated with a nontransferring release agent and obtainable from Aero Consultants Limited. This was followed by the sheet 13 of Celgard microporous film 4510, the breather material 14 of Airweave N10 polyester breather felt material and finally the membrane 15 of Capran 512H nylon vacuum bagging film.

The laid-up prepregs were preconsolidated under a vacuum of 16±16 mbars for 30 minutes at room temperature. The temperature of the hot plate was then increased from room temperature to 130°±3° C. at the rate of 1° to 3° C. per minute. The temperature was maintained at 130°± 3° C. for 90 minutes in order to allow the prepregs to outgas, coalesce, conform to the configuration of the mould 10 and finally gel. The temperature was then increased at the rate of 1°–3° C. per minute to 175°±5° C. and maintained at that temperature for 60 minutes to complete the cure of the resin. The temperature was then reduced to below 60° C. before the vacuum was removed and the assembly dismantled to remove the moulded article. The article was then heated at 190°±5° C. for 4 hours in order to effect a postcure of the resin.

Upon examination of the moulded article, it was found that although its lower surface finish was not entirely satisfactory, the level of porosity within the article was less than 1%. Each ply of the moulded article was 0.0105±0.001 inches (0.226±0.025 mm) thick.

EXAMPLE 2

In order to reduce the small degree of porosity present in the article manufactured in the previous example and to improve the surface finish of its lower surface, the method described in Example I was repeated with two modifications. Firstly, in order to reduce the porosity in the final article, the prepregs were individually laid-up on the former with each successive prepreg being consolidated for 15 minutes under a minimum vacuum of 16±16 m bars. Secondly, a sheet of release fabric called Tygaflor which is a non-porous PTFE coated fibreglass obtainable from Fothergill and Harvey Limited was interposed between the laid up prepregs 12 and the mould 10.

The resultant article was found to be free of porosity and had an excellent surface finish.

The method of the present invention provides that the moulding operation may be carried out with zero resin bleed i.e. with no resin loss during the moulding operation. This being so, the amount of resin in the prepregs 12 may be fixed at the level desired in the final moulded article. It must be born in mind, however, that if the reinforcing filaments in the prepregs 12 are woven, they will exhibit a certain degree of resilience. This being so the atmospheric pressure exerted on the prepregs during the moulding operation may be insufficient to completely compress the woven filaments. If the amount of resin present in the prepregs is only sufficient to provide a continuous matrix if complete compression of the woven filaments is achieved then incomplete compression will leave voids within the resultant moulded article. In such circumstances it is necessary to provide a small increase in the resin content in the prepregs in order to ensure that such voids are not present whilst at the same time avoiding any bleeding of the resin out of the moulded article.

If a certain degree of resin bleed is desired a layer of a suitable porous material may be interposed between the layer of release fabric (if used) and the sheet 13 of microporous film material.

We claim:

1. A method of vacuum moulding an article from a filament reinforced composite material comprising the steps of (1) laying up, on a suitable former, a plurality of prepregs, each comprising reinforcing filaments enclosed in an uncured resin, (2) overlaying at least a major portion of the exposed surface of said laid-up prepregs with at least one sheet of a microporous film material which acts as a barrier to particles which are greater than 0.04 microns in size and which film is premeable to gases and vapours but impermeable to liquid resin, (3) overlaying at least a major portion of said sheet of microporous film material with a breather material, (4) enclosing said laid-up prepregs, said at least one sheet of microporous film material and said breather material with a gas impermeable membrane, (5) evacuating the volume enclosed by said membrane and maintaining said prepregs at room temperature a sufficient time to preconoslidate said prepregs (6) then gradaully increasing the temperature of said prepregs to a temperature which is high enough to cause the resin in said prepregs to outgas and become sufficiently mobile to permit the coalescing and moulding of said prepregs to take place and for said resin to subsequently gel but low enough for outgasing to be substantially completed before said gelling commences, and holding said temperature for a sufficient time for said outgasing, moulding and gelling to occur, subsequently (7) gradually increasing the temperature of said prepregs to 45 centrigrade degrees higher than the temperature of outgassing step (6). and holding said increased temperature a sufficient time to cure said resin, and then (8) reducing the temperature followed by discontinuing said evacuating and removing the resultant article from said former.

2. A method of vacuum moulding an article as claimed in claim 1 wherein a release material is interposed between the surface of said laid-up prepregs and said sheet of microporous film material.

3. A method of vacuum moulding an article as claimed in claim 1 wherein a release material is interposed between the surface of said laid-up prepregs and said former.

4. A method of vacuum moulding an article as claimed in claim 1 wherein said filaments are of carbon.

5. A method of vacuum moulding an article as claimed in claim 1 wherein said uncured resin is an epoxy resin.

6. A method of vacuum moulding an article from a filament reinforced composite material comprising the steps of (1) laying up, on a suitable former, a prepreg comprising reinforcing filaments enclosed in an uncured resin, (2) overlaying at least a major portion of the exposed surface of said laid-up prepreg with at least one sheet of a microporous film material which acts as a barrier to particles which are greater than 0.04 microns in size and which film is permeable to gases and vapours but impermeable to liquid resin, (3) overlaying at least a major portion of said sheet of microporous film material with a breather material, (4) enclosing said laid-up prepreg, said at least one sheet of microporous film material and said breather material with a gas impermeable membrane, (5) evacuating the volume enclosed by said membrane and maintaining said prepreg at room temperature a sufficient time to preconsolidate said prepreg, (6) repeating steps (1) through (5) to lay up and preconsolidate a plurality of said prepregs, (7) then gradually increasing the temperature of said prepregs to a temperature which is high enough to cause the resin in said prepregs to outgas and become sufficiently mobile to permit the coalescing and moulding of said prepregs to take place and for said resin to subsequently gel but low enough for outgassing to be substantially completed before said gelling commences, and holding said temperature for a sufficient time for said outgassing, moulding and gelling to occur, subsequently, (8) gradually increasing the temperature of said prepregs to a temperature about 45 centigrade degrees higher than the temperature of outgassing step (7) and holding said increased temperature a sufficient time to cure said resin, and then, (9) reducing the temperature followed by discontinuing said evacuating and removing the resultant molded article from said former.

* * * * *